United States Patent
Lee et al.

(10) Patent No.: US 9,876,898 B2
(45) Date of Patent: *Jan. 23, 2018

(54) SYSTEMS AND METHODS FOR PROVIDING ALTERNATE LINE SELECTION INFORMATION ON A MOBILE DEVICE

(71) Applicant: BLACKBERRY LIMITED, Waterloo (CA)

(72) Inventors: John Jong-Suk Lee, Waterloo (CA); Leonid Vymenets, North York (CA); Kevin John Oerton, Waterloo (CA); Sherryl Lee Lorraine Scott, Etobicoke (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,975

(22) Filed: Feb. 8, 2017

(65) Prior Publication Data

US 2017/0149960 A1    May 25, 2017

Related U.S. Application Data

(63) Continuation of application No. 14/993,471, filed on Jan. 12, 2016, now Pat. No. 9,602,651, which is a continuation of application No. 12/041,683, filed on Mar. 4, 2008, now Pat. No. 9,270,800.

(51) Int. Cl.
| | |
|---|---|
| *H04M 1/57* | (2006.01) |
| *H04M 1/725* | (2006.01) |
| *H04M 1/2745* | (2006.01) |

(52) U.S. Cl.
CPC ... *H04M 1/72583* (2013.01); *H04M 1/27455* (2013.01); *H04M 1/57* (2013.01); *H04M 2250/66* (2013.01)

(58) Field of Classification Search
CPC ............... H04M 1/27455; H04M 1/57; H04M 1/72583; H04M 2250/66; G06F 17/30979; G06F 17/30994
See application file for complete search history.

(56) References Cited

U.S. PATENT DOCUMENTS 9,602,651 B2 * 3/2017 Lee ................... H04M 1/27455

OTHER PUBLICATIONS

Lee, John Jong-Suk, et al., "Systems and Methods for Providing Alternate Line Selection Information on a Mobile Device", U.S. Appl. No. 12/041,683, filed Mar. 4, 2008, now U.S. Pat. No. 9,270,800, issued Feb. 23, 2016.
Lee, John Jong-Suk, et al., "Systems and Methods for Providing Alternate Line Selection Information on a Mobile Device", U.S. Appl. No. 14/993,471, filed Jan. 12, 2016.

* cited by examiner

*Primary Examiner* — Olumide T Ajibade Akonai
(74) *Attorney, Agent, or Firm* — Perry+ Currier Inc.

(57) ABSTRACT

A system and method for providing a user interface that allows users to change the active line on which an outgoing call may be placed. In example embodiments, upon detecting call screen interaction a line selection menu is displayed. The line selection menu contains a plurality of line identifiers, each line identifier uniquely identifying a corresponding one of the multiple communication lines accessible at the mobile device. A system and method is also presented for providing a call log for identifying call activity associated with a plurality of communication lines.

20 Claims, 10 Drawing Sheets

SYSTEMS AND METHODS FOR PROVIDING ALTERNATE LINE SELECTION INFORMATION ON A MOBILE DEVICE

CROSS-REFERENCE TO RELATED APPLICATIONS

This application is a continuation of U.S. patent application Ser. No. 14/993,471, filed Jan. 12, 2016, which is a continuation of U.S. patent application Ser. No. 12/041,683, filed Mar. 4, 2008 (now U.S. Pat. No. 9,270,800, issued Feb. 23, 2016), which is incorporated herein by reference.

TECHNICAL FIELD

Embodiments described herein relate generally to mobile device applications, and more specifically to phone-equipped mobile devices that allow outgoing calls to be made by a user on a communication line selected from a plurality of communication lines.

BACKGROUND

Many modern mobile devices are multi-functional. They may be configured to allow users to engage in both electronic mail ("e-mail") communications and telephone communications, for example. Additionally, it is common for a user to utilize the mobile device for different purposes. For example, a user may operate a single mobile device to engage in communications relating to both business and personal uses.

Phone-equipped mobile devices may be adapted to accommodate an Alternate Line Service (ALS) or similar multi-line service. With respect to these mobile devices, two or more phone numbers may be associated with a mobile device, with each phone number being associated with a different communication line. A user may wish to place an outgoing call on a specific communication line so that when the call is received by a receiving party, the phone number associated with that communication line will be identified on the receiving party's phone where "call display" (or "Caller ID") functionality has been enabled on that phone. Use of multiple communication lines may also be useful for line-specific tracking purposes (e.g. to facilitate separate billing for calls relating to business and personal uses).

Typically, in mobile device applications, only one communication line is deemed to be "active" at any given time (although in some instances it is possible to have a call on multiple lines at once, as will be understood). Outgoing calls are placed on the active line until an alternate communication line is selected. Outgoing calls are generally initiated by a user from a call screen provided by an application (e.g. a phone application) residing and executing on the mobile device. A user may forget or not be aware that ALS functionality is available on the mobile device. Further, a user may wish to keep track of calling activity by corresponding communication line.

BRIEF DESCRIPTION OF THE DRAWINGS

For a better understanding of example embodiments described herein, and to show more clearly how they may be carried into effect, reference will now be made, by way of example, to the accompanying drawings in which.

DETAILED DESCRIPTION

Embodiments described herein are generally directed to a system and method for providing ALS information to mobile device users and a user interface therefore.

In a broad aspect, there is provided a method of providing on a mobile device a dynamic user interface for identifying a plurality of communication lines on which outgoing calls may be made, the method comprising: displaying a call screen on a display of the mobile device; scanning for call screen interaction; and upon detecting call screen interaction, displaying on the display a line selection menu containing a plurality of line identifiers, each line identifier uniquely identifying a corresponding one of the communication lines.

These and other aspects and features of various embodiments will be described in greater detail below.

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
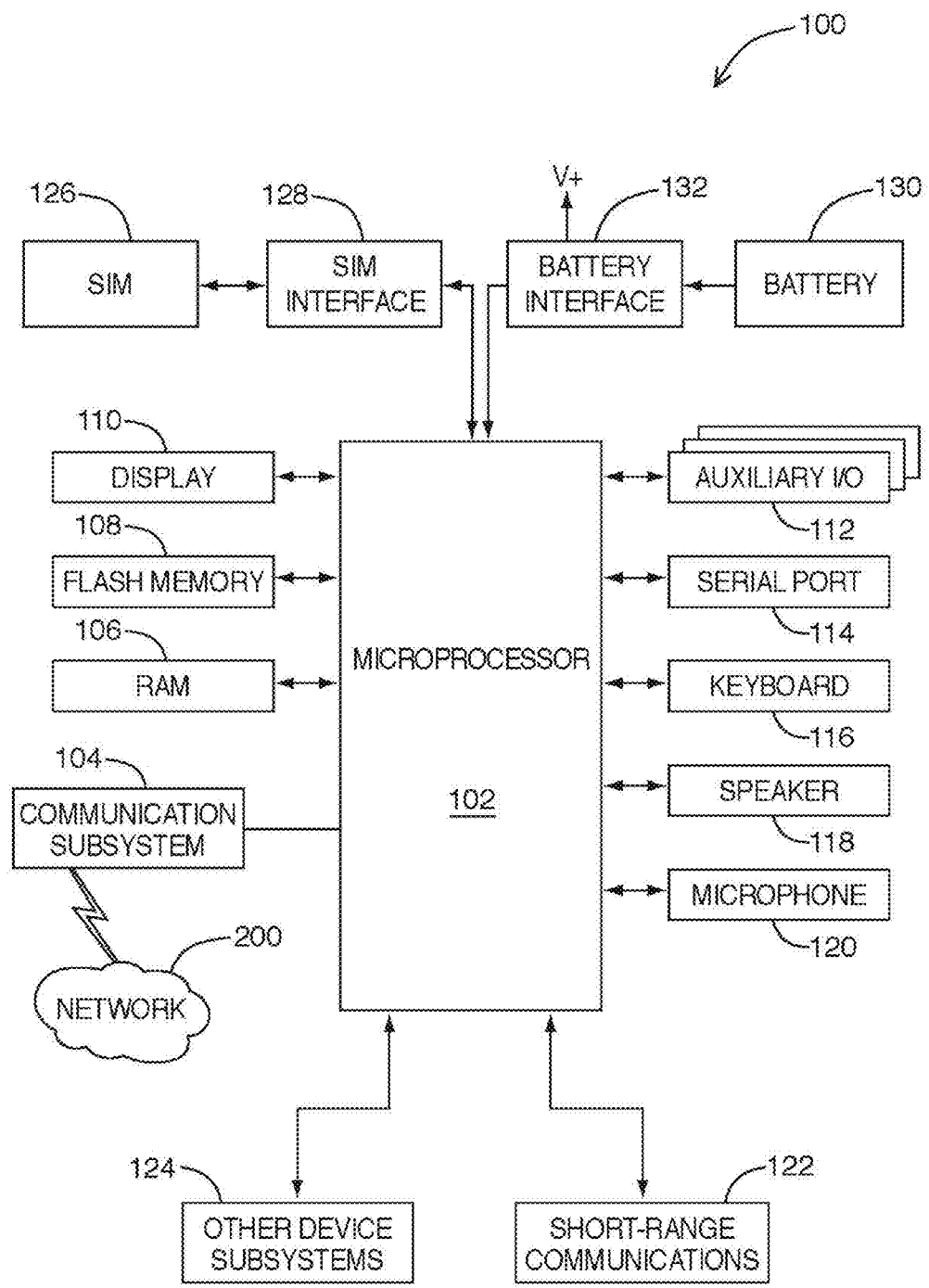
FIG. 1 is a block diagram of a mobile device in one example implementation.
Figure 2:
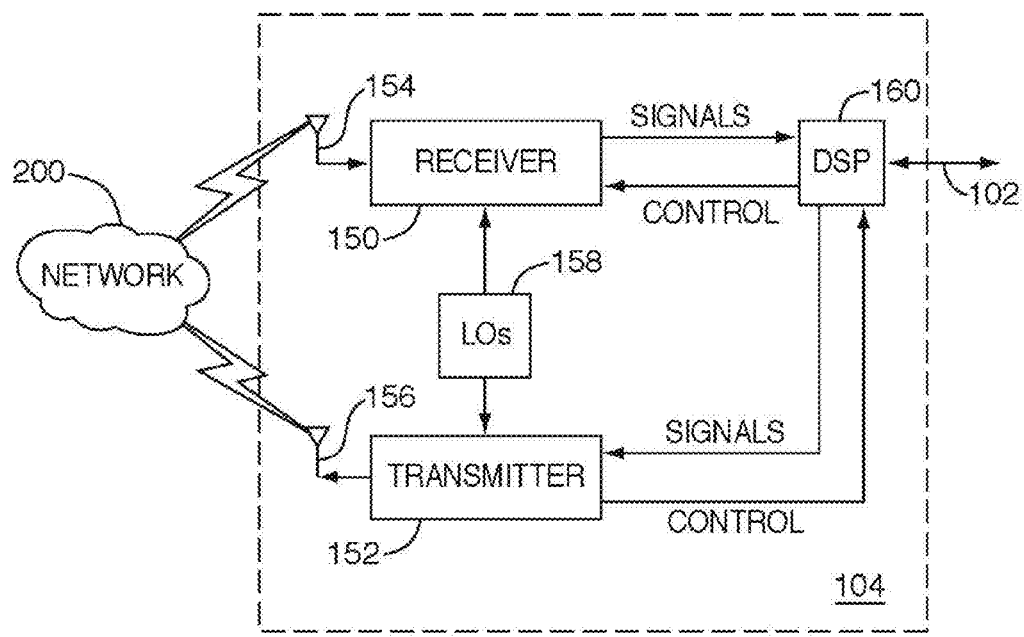
FIG. 2 is a block diagram of a communication subsystem component of the mobile device of FIG. 1.
Figure 3:
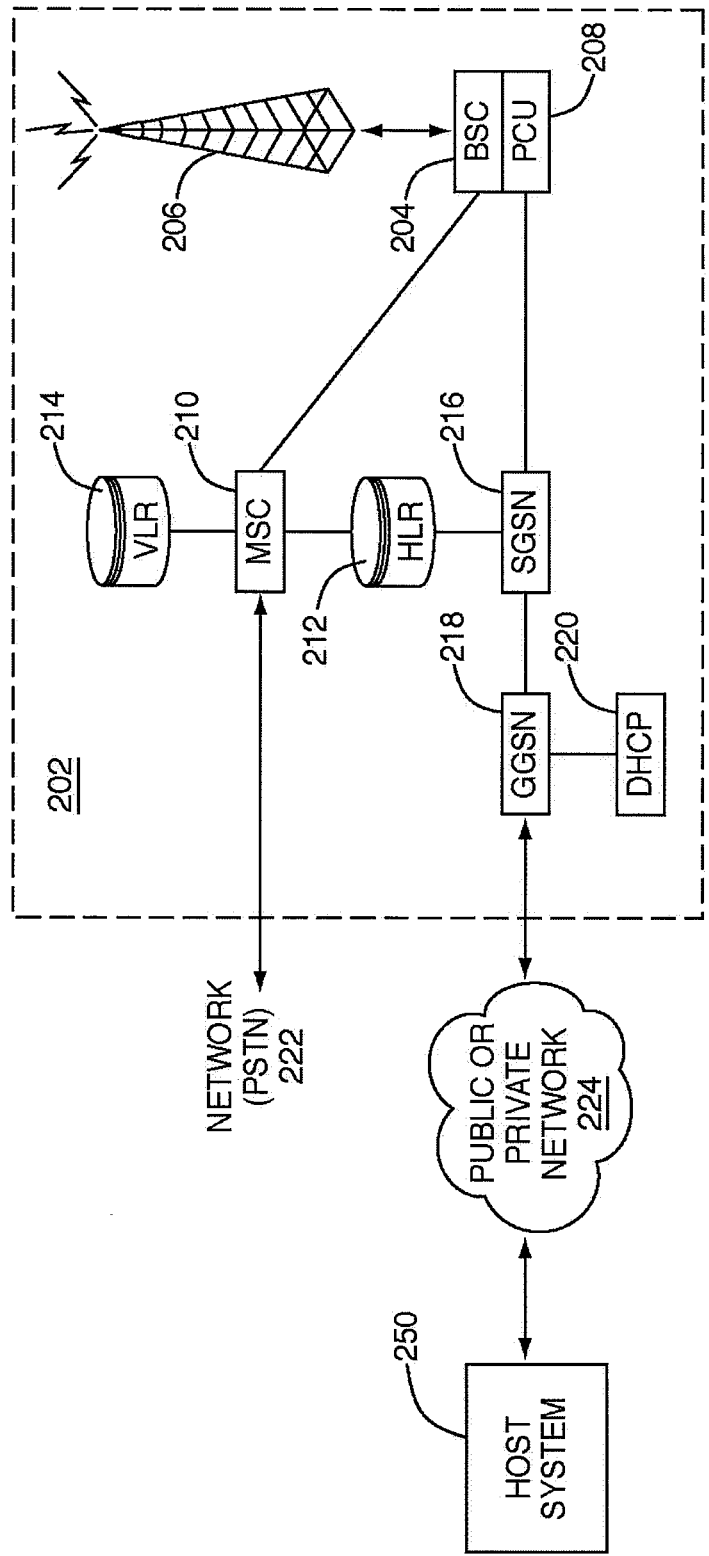
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Alternatively, the network and device 100 might employ WiFi/WiMax radios utilizing SIP (session initialization protocols) and VoIP (voice over internet protocols). Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth™, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device.

MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be de-allocated and the IP address returned to the IP address pool managed by DHCP server 220.

Figure 4:
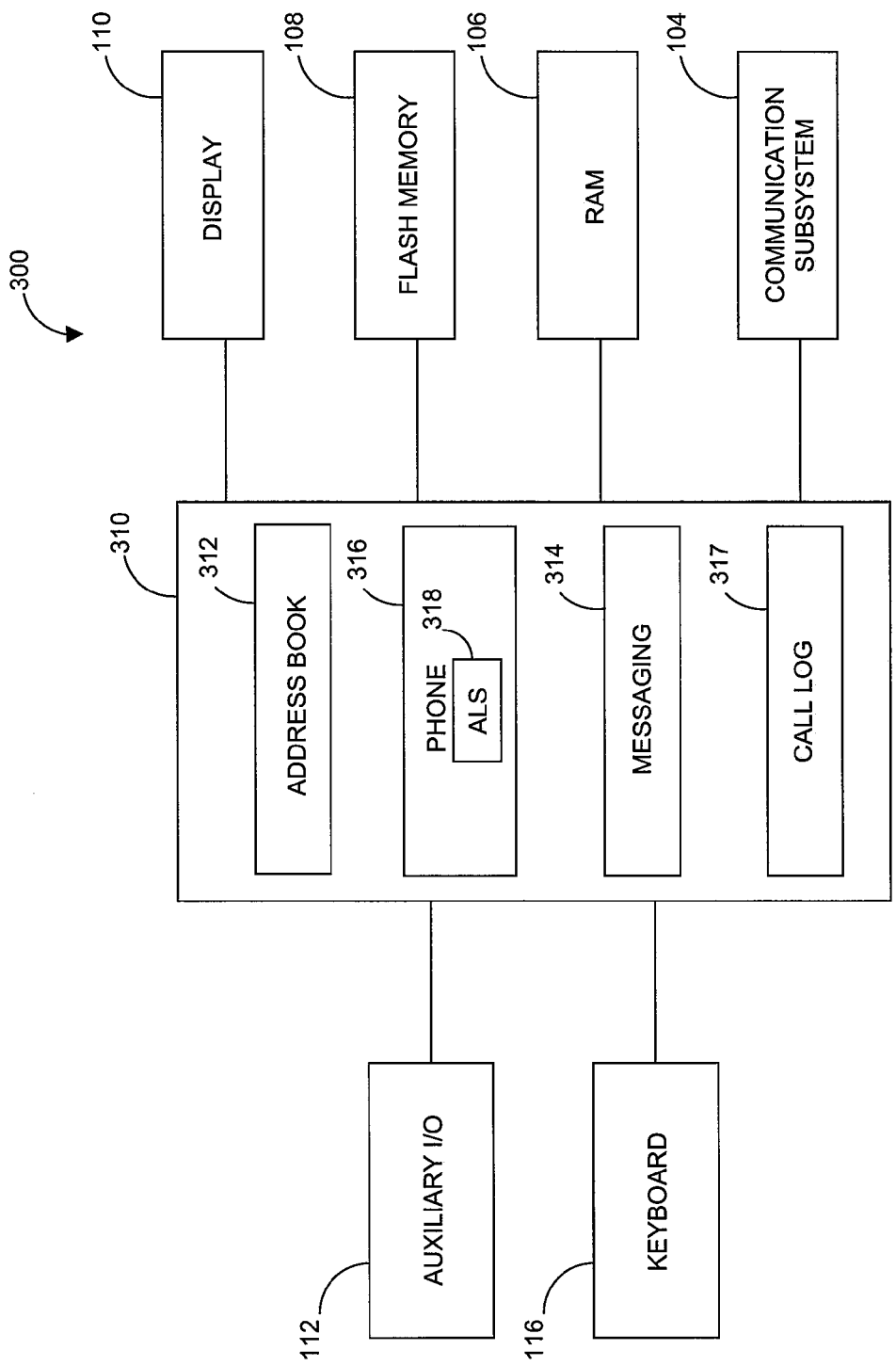
FIG. 4 is a block diagram illustrating further aspects of the example mobile device of FIG. 1.

Referring now to FIG. 4, a block diagram illustrating further aspects of mobile device 100 of FIG. 1 is shown generally as 300. As noted earlier with reference to FIG. 1, microprocessor 102, in addition to its operating system functions, enables execution of software applications on mobile device 100. A set of applications that control basic device operations, including data and voice communication applications, will normally be installed on mobile device 100 during its manufacture. Operating system software and other software applications are typically stored in a persistent store (e.g. flash memory 108) or other store, on mobile device 100 or on a device coupled thereto. It will be understood that the operating system, software applications or parts thereof, may be temporarily loaded in a volatile store such as RAM 106. Other instructions and/or data received by the mobile device 100 and subject to processing may also be temporarily stored in RAM 106.

Software applications that are loaded or stored on mobile device 100 may be implemented as functional components or modules 310. Modules 310 interact with various components of mobile device 100. For instance, as shown by way of example in FIG. 4, modules 310 may interact with communication subsystem 104, RAM 106, flash memory 108, display 110, auxiliary I/O device(s) 112, and keyboard 116. Modules 310 may comprise, for example, an address book module 312, a messaging module 314 (e.g. for e-mail and/or SMS or MMS messaging), phone application module 316, and a call log module 317.

Address book module 312 is generally configured to allow contact information (e.g. individual contact and company names, telephone numbers, messaging addresses, and other information) to be stored and managed. Messaging module 314 facilitates the sending and receiving of electronic messages over a wireless network 200 and/or other networks.

Phone application module 316 is generally configured to facilitate voice communication between the user and other parties, including the placement of outgoing calls by the user and the reception of incoming calls on the mobile device 100. Call log module 317 is generally configured to store and manage calling activity data (for example, time and date of incoming or outgoing calls, and third party phone numbers involved in such calls).

Calls may be placed and received on a communication line specifically configured for voice communications. In certain embodiments, calls may alternatively or additionally be placed and received on other types of communication lines, including a communication line generally configured for data communications, or a communication line configured for both voice and data communications, for example. For example, mobile device 100 may be configured to provide Voice over IP (VoIP), Enterprise Voice, and/or video phone functionality.

Embodiments described herein are generally applicable to mobile devices that provide access to multiple (i.e. two or more) communication lines on which outgoing calls may be placed, as initiated by a mobile device user. Typically, these mobile devices will also be configured to allow incoming calls to be received by the user over the same communication lines.

In example embodiments, each of the multiple communication lines has a different telephone number associated therewith. For example, a user may have a business phone number and a different personal phone number. When a user places an outgoing call on a specific communication line, the phone number associated with that communication line may be identified on a receiving party's phone that is equipped with "call display" functionality.

Referring again to FIG. 4, a line selection module (e.g. alternate line service (ALS) module) 318 is provided to facilitate selection of the communication line to be used by phone application module 316 for placing an outgoing call, for example. The line selection module 318 is configured to select a communication line to be used by phone application module 316, based upon line selection data stored on mobile device 100 (e.g. configuration settings that define a default communication line), and/or based upon input received by the user. It will be understood that the functionality of line selection module 318 may be provided or otherwise integrated with phone application module 316 or with a different module on mobile device 100.

The currently selected communication line on which an outgoing call may be placed at any given time is also referred to herein as the "active" line. Outgoing calls will be placed on the active line by phone application module 316 until an alternate communication line is selected.

When a user wishes to initiate an outgoing call, the user will typically be required to access a call screen provided by an application (e.g. phone application module 316) on mobile device 100. Data identifying the active line will be displayed to the user in a first display field (e.g. "My Number" field, or phone status field) of the call screen, allowing the user to quickly identify the communication line on which an outgoing call will be placed should the user choose to initiate such call. This display field may also be referred to as an active line data display field. The data identifying the active line typically comprises a telephone number, but may alternatively or additionally comprise some other communication line identifier(s), such as a line descriptor, alias and/or other identifier, for example.

Should the user wish to initiate an outgoing call to be placed on an alternate communication line, the user may need to change the current active line using a different application or in a separate screen, and then return to the call screen to place the call on the alternate communication line after the change is made.

Embodiments described herein are generally directed to systems and methods for providing on a mobile device a dynamic user interface for identifying a plurality of communication lines on which outgoing calls may be made.

In some embodiments, a mobile device is provided which is configured to provide a dynamic user interface for identifying a plurality of communication lines on which outgoing calls may be made. The mobile device may comprise a processor, a display, and at least one input device, and the processor may be configured to execute an application programmed to perform the steps of the method.

A call screen may be displayed on a display of the mobile device. The call screen may be provided with a first display field (e.g. "My Number" field or phone status field) in which a first line identifier identifying a first of the plurality of communication lines may be displayed. For example, for a communication line on which the user may place an outgoing call, the telephone number correlated to the corresponding communication line may be displayed as the corresponding line identifier. As a further example, one or more line descriptors, aliases and/or other identifiers may be displayed, in addition to or instead of the telephone number, as a line identifier. The device may scan or wait for interaction with the call screen. Upon detection of call screen interaction, the device may display on the display a line selection menu containing a plurality of line identifiers, each line identifier uniquely identifying a corresponding one of the communication lines.

The call screen interaction may comprise the movement of a selection element (e.g. a highlight bar, pointer, cursor, or other means to identify and select menu or list items) displayed on the call screen. The movement of the selection element into a first display field or into an outgoing call input field may be required for the line selection menu to be displayed. Alternatively, the call screen interaction may comprise input corresponding to the initiation of an outgoing call (e.g. the inputting of a telephone number). The input may also be provided by the user by depressing a navigation tool such as a mouse button, track ball, thumb wheel, touchpad, or a pre-programmed key, for example.

In some embodiments, a computer-readable medium is provided comprising instructions executable on a processor of the mobile device for implementing the method.

In another embodiment, a mobile device is provided which is configured to provide a dynamic user interface for identifying a plurality of communication lines on which outgoing calls may be made. The mobile device provides access to a plurality of communication lines on which outgoing calls may be made by a user, the mobile device comprising a processor, a display, and at least one input device, wherein the processor is configured to execute an application programmed to perform the steps of the method.

In yet another embodiment, a method of providing on a mobile device a call log for identifying call activity associated with a plurality of communication lines, is provided. The method comprises: displaying a call screen on a display of the mobile device and displaying call log data within a call log field on the display. The call log data includes at least one call entry and each call entry includes: call data corresponding to a third party telephone number, and a line indicia. Further, each line indicia uniquely corresponds to one of the communication lines.

The call entry may comprise a call activity indicia, wherein each call activity indicia uniquely corresponds to a calling activity. The calling activity may include placing an outgoing call or receiving an incoming call.

In some aspects, the method may include selecting one from a plurality of call log categories, wherein each call log category corresponds to at least one communication line, and filtering the call entries for call entries corresponding to the selected call log category. One of the plurality of call log categories may correspond to all of the communication lines, collectively. At least one call entry corresponding to the selected call log category may be displayed.

In some aspects, the method may also include: grouping the call log entries by line indicia, and displaying the grouped call log entries. Furthermore, the groups of call log entries may be ranked. For certain embodiments, a communication line is selected and the group of call log entries having the line indicia corresponding to the selected communication line is displayed first.

A computer-readable medium may be provided which comprises instructions executable on a processor of the mobile device for implementing the method. Similarly, embodiments may be directed to a system for providing a user interface that facilitates user selection of a communication line for an outgoing call on a mobile device, the mobile device providing access to a plurality of communication lines on which outgoing calls may be made by a user, the mobile device comprising a processor, a display, and at least one input device, wherein the system is configured to execute an application programmed to perform the steps of the method.

In alternate embodiments, a mobile device has a call log for identifying call activity associated with a plurality of communication lines on the mobile device. The mobile device comprises a processor, a display, and at least one input device, wherein the mobile device is configured to access a plurality of communication lines, and wherein the processor is configured to execute an application programmed to perform the steps of: displaying a call screen on a display of the mobile device and displaying call log data within a call log field on the display. The call log data comprises at least one call entry and each call entry includes: call data corresponding to a third party telephone number, and a line indicia. In turn, each line indicia uniquely corresponds to one of the communication lines.

Figure 5:
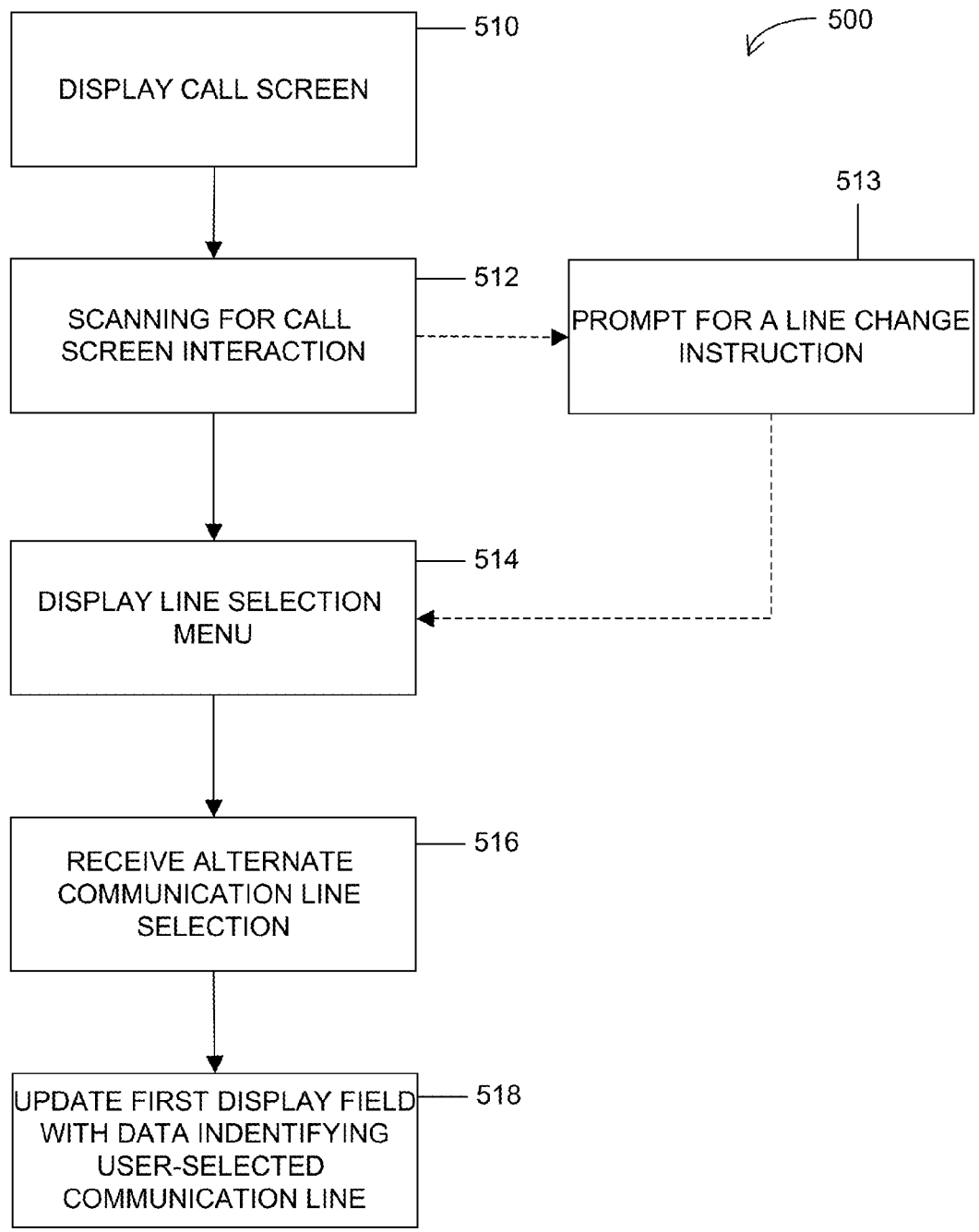
FIG. 5 is a flowchart illustrating steps of a method of providing a user interface that facilitates user selection of a communication line in accordance with at least one embodiment.

Referring now to FIG. 5, a flowchart illustrating steps of a method of providing on a mobile device a dynamic user interface for identifying a plurality of communication lines on which outgoing calls may be made, in accordance with at least one embodiment, is shown generally as 500. Additional details of some of the features described below in respect of the steps of method 500 may be described elsewhere in the present specification. Referring now also to FIGS. 6A to 6D, illustrated therein are screenshots of a user interface provided to a user in one example implementation of an embodiment of the method of FIG. 5 are shown.

In one embodiment, the steps of method 500 are performed at the mobile device by an application (e.g. phone application module 316 of FIG. 4) that typically executes and resides on the CPU of the mobile device (e.g. mobile device 100 of FIG. 1). The application need not be a stand-alone application, and the functionality described herein may be implemented in one or more applications executing and residing on the mobile device 100.

At Block 510 (shown in FIG. 5), a call screen (such as screen 600 illustrated in FIG. 6A) is displayed to the user on a display (e.g. display 110 of FIG. 1) of the mobile device 100. A user may access the call screen when the user wishes to initiate an outgoing call. This may require first activating a phone application or other application on the mobile device 100, by selecting a corresponding item or icon from a menu or home screen, for example (not shown). As noted previously, the mobile device 100 provides access to multiple communication lines on which outgoing calls may be placed.

Figure 6A:
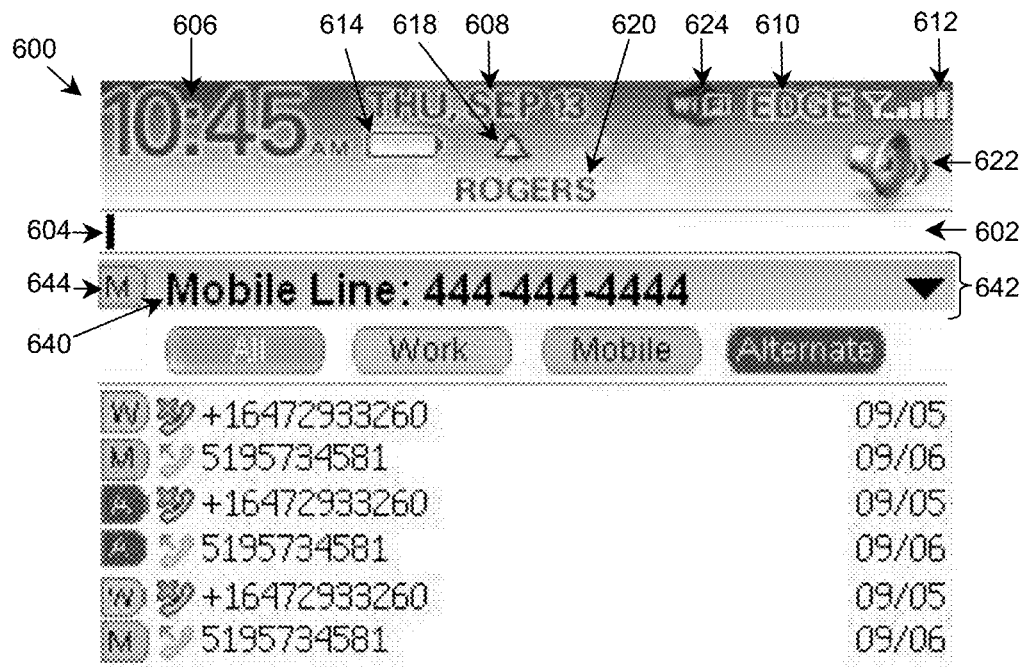
FIGS. 6A to 6D are examples of screenshots of a user interface provided to a user in accordance with an example implementation of one embodiment.

In FIG. 6A, screenshot 600 illustrates a user interface displayed in a display 110 of a mobile device 100 (shown in FIG. 1), namely a call screen from which the user can place outgoing calls. Call screen 600 is displayed to the user, awaiting user input (e.g. a number to be dialed). A number entry field 602 is provided, and cursor 604 is settled within number entry field 602, indicating that the user may provide a call number (e.g. using a keyboard or keypad). General indicators may be displayed on call screen 600, including for example, time 606, date 608, network indicator 610, signal strength 612, battery strength 614, alarm indicator 618, service provider indicator 620, ringer indicator 622, and/or Bluetooth™ indicator 624.

A first line identifier 640 identifying a first of the multiple communication lines accessible at the mobile device 100 is displayed in a first display field 642 ("active line display field") of the call screen 600. The first display field 642 may be referred to as a "My Number" field or a "phone status" field, and data 640 displayed therein identifies the active line, allowing the user to quickly identify the line on which an outgoing call will be placed should the user choose to initiate such a call.

The data 640 identifying the active line typically comprises a telephone number associated with the active line, but may alternatively or additionally comprise some other communication line identifier(s), such as, for example, one or more aliases, identifiers and/or other descriptors (e.g. "Mobile Line", "Work Line", "Alternate Line"), which may be user-defined. A line indicia or icon 644 uniquely corresponding to the active communication line may also be displayed in the first display field 642 of the call screen 600.

At Block 512 (shown in FIG. 5), the mobile device 100 scans or waits for call screen interaction by the user. As will be understood, such scanning or writing may be active or passive.

Subsequently, an input or other call screen interaction by the user may be detected. For example, such call screen interaction may involve the movement of a selection element (e.g. a highlight bar, pointer, cursor 604, or other means to identify and select menu or list items). The selection element may be re-positioned at the direction of the user, using an input device such as a thumb wheel, track ball, keyboard, mouse, touchpad or other input device. For example, the user may use a track ball on the mobile device 100, where provided, to manipulate a highlight bar shown in the call screen 600.

Alternatively, call screen interaction may be detected when a selection element (e.g. a highlight bar, pointer, cursor 604, or other means to identify and select menu or list items) displayed on the call screen 600 has been moved into the first display field 642. For example, by rotating the track ball, a highlight bar may be re-positioned to highlight the data 640 displayed in the first display field 642 (e.g. the telephone number associated with the active line) of the call screen 600. Alternatively, the detected call screen interaction may involve movement of a selection element into the outgoing call input or number entry field 602. Yet other call screen interaction which may be detected may involve the inputting of a telephone number in the number entry field 602 by the user in order to initiate an outgoing call.

Figure 6B:
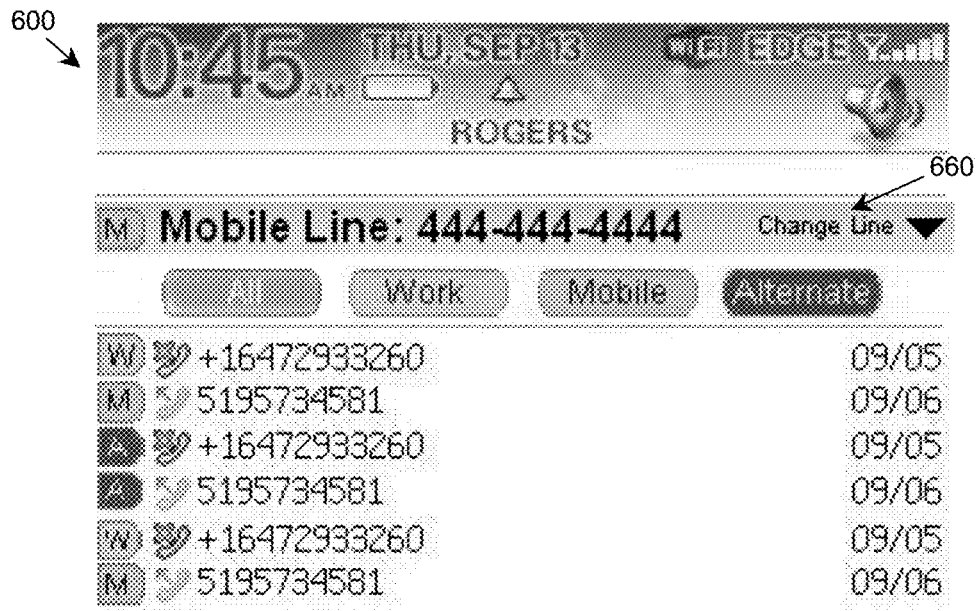
Figure 6C:
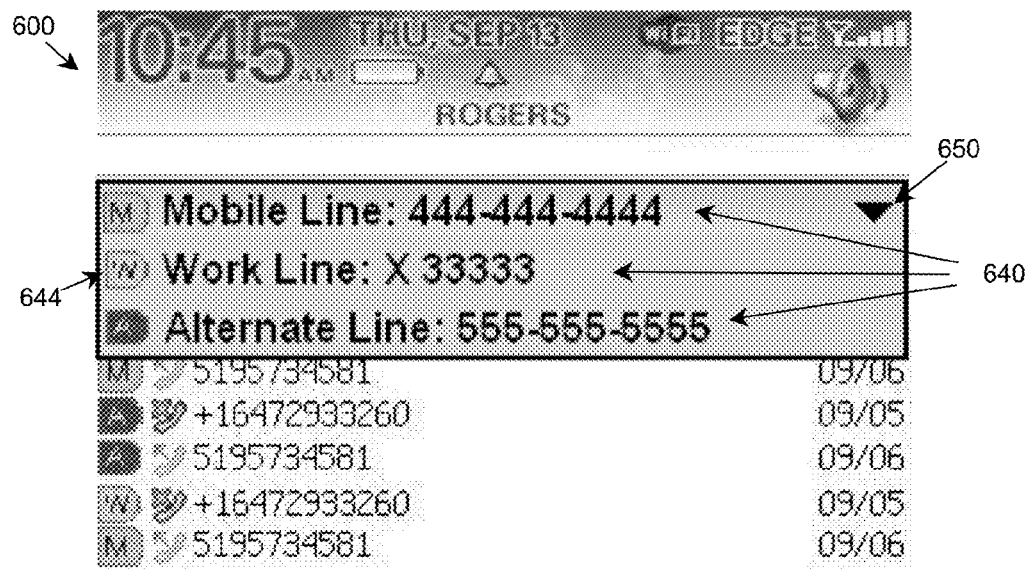
Figure 6D:
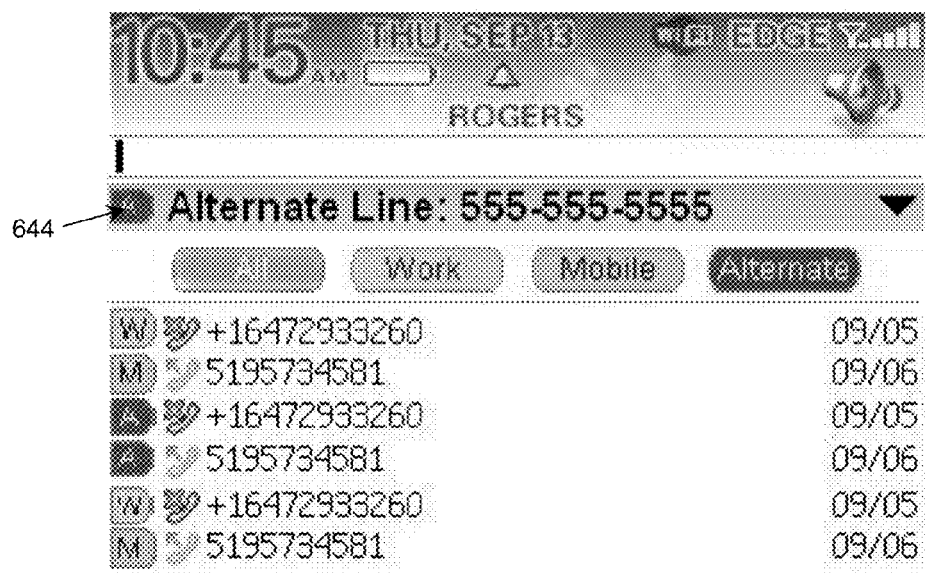

At Block 514 (shown in FIG. 5), upon detection of call screen interaction, as illustrated in FIG. 6C, a line selection menu 650 is displayed on the display. The line selection menu 650 comprises a plurality of line identifiers 640, each uniquely identifying a corresponding one of the communication lines on which the user may place or make an outgoing call (or receive an incoming call). Line identifiers 640 identifying at least a subset of the multiple communication lines accessible at the mobile device 100 are displayed on the line selection menu 650. In the example illustrated in FIG. 6C, the line selection menu 650 identifies all the communication lines available on the example embodiment of the mobile device 100.

In the example embodiment illustrated in FIG. 6C, the line identifier 640 corresponding to the currently active line appears first in the line selection menu 650.

It may be the case that the mobile device 100 provides access to multiple communication lines, but not all are activated for use, or the use of certain lines has been restricted in some manner (e.g. as configured by a security policy), or certain lines are otherwise unavailable, for example. In such embodiments, the line selection menu 650 may display only the line identifiers 640 corresponding to those communication lines that have been activated and on which the user is permitted to place an outgoing call.

In some embodiments, as an alternative to immediately displaying the line selection menu 650 upon detection of call screen interaction, at Block 513 (shown in FIG. 5), the call screen 600 might first prompt for a line changed instruction, e.g. by displaying a "Change Line" indicia 660 in the first display field 642 (as illustrated in FIG. 6B). In order for the line selection menu 650 to be displayed at Block 514 (shown in FIG. 5), the user may then input a "change line" command. For example, the user may depress the track wheel or track ball while the "Change Line" indicia 660 is displayed, to enter the "Change Line Command" and cause the line selection menu 650 to be displayed.

At Block 516 (shown in FIG. 5), the user may select an alternate communication line. A selection element (e.g. a highlight bar, pointer, cursor, or other means to identify and select menu or list items) may be displayed within the line selection menu 650 and may be re-positioned at the direction of the user, using an input device such as a thumb wheel, track ball, keyboard, mouse, touch pad, touch screen or other input device. For example, the user may use a track ball on mobile device 100, where provided, to manipulate a highlight bar shown in the display 110. In particular, by rotating the track ball in this example, the highlight bar may be re-positioned to highlight the line identifier 640 associated with a particular communication line (e.g. the telephone number associated with one of the subset of the multiple communication lines) displayed in the line selection menu 650. Once the user highlights a desired communication line, by manipulating the track ball so that the highlight bar settles on the corresponding line identifier 640, the user may then take further action. For example, the user may depress the track ball to select the desired communication line.

At Block 518 (shown in FIG. 5), upon selection of a different communication line, the first display field 642 is updated with data 640 identifying the user-selected communication line. Accordingly, the user-selected communication line is identified to the user as the current active line. In the example illustrated in FIG. 6D, the "Alternate Line" has been selected in Block 516 (shown in FIG. 5), which has become the currently active line on which outgoing calls will be placed.

Figure 7:
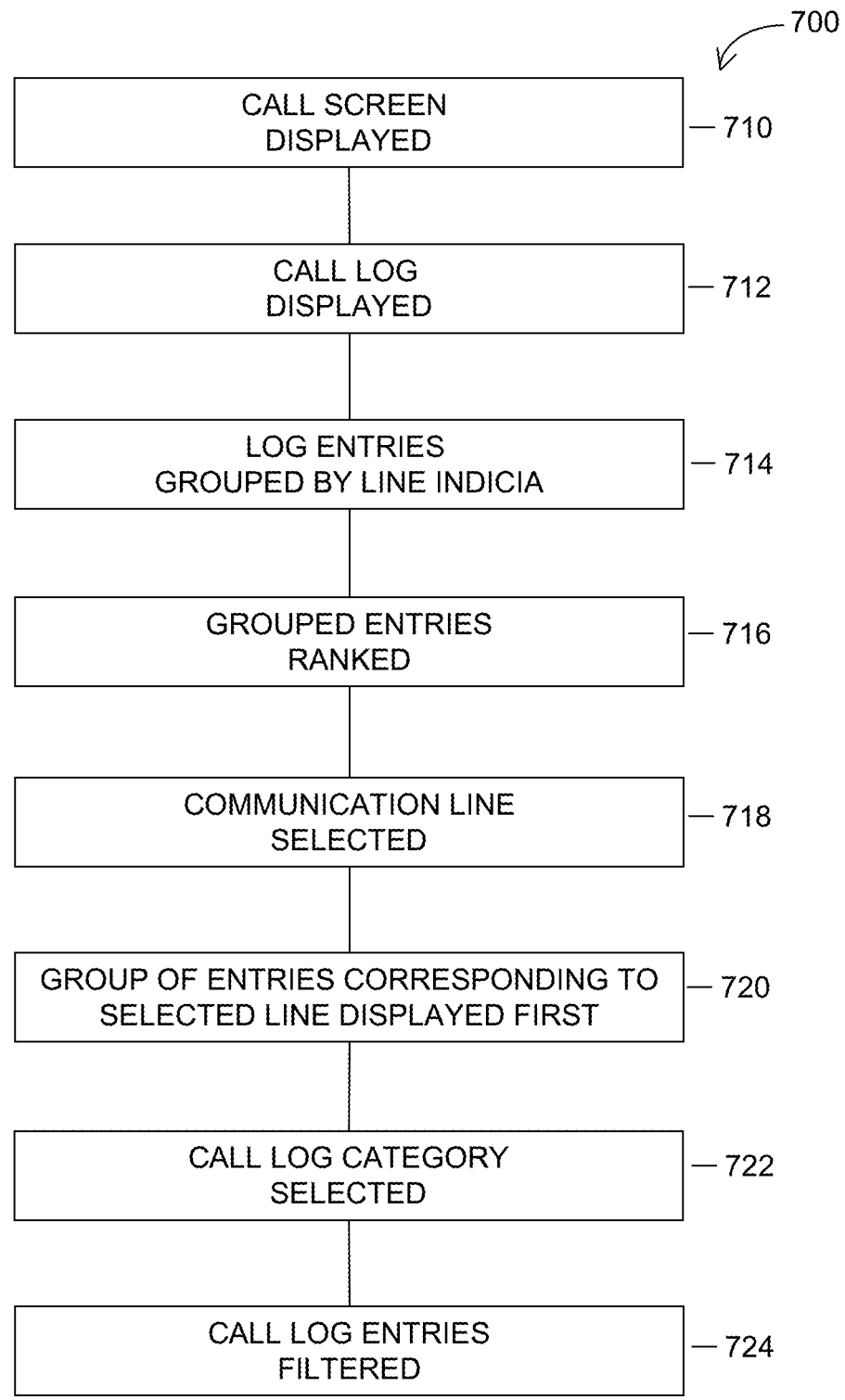
FIG. 7 is a flow chart illustrating steps of a method of displaying a call log on a mobile device in accordance with at least one embodiment.

Referring now to FIG. 7, a flowchart illustrating steps of a method of providing on a mobile device a call log for identifying call activity associated with a plurality of communication lines, in accordance with at least one embodiment, is shown generally as 700. Additional details of some of the features described below in respect of the steps of method 700 may be described elsewhere in the present specification. Referring now also to FIGS. 8A to 8D, illustrated therein are screenshots of a user interface provided to a user in one example implementation of an embodiment of the method of FIG. 7 are shown.

In one embodiment, the steps of method 700 are performed at the mobile device by an application (e.g. call log module 317 of FIG. 4) that typically executes and resides on the CPU of the mobile device (e.g. mobile device 100 of FIG. 1). The application need not be a stand-alone application, and the functionality described herein may be implemented in one or more applications executing and residing on the mobile device.

At Block 710 (shown in FIG. 7), a call screen (such as screen 800 illustrated in FIG. 8A) is displayed to the user on a display (e.g. display 110 of FIG. 1) of the mobile device 100.

The call screen 800 provides a call log field 810 in which call log data 812 stored in memory (e.g. flash memory 108) and associated with previously placed outgoing calls and received calls (e.g. including answered and missed calls) is displayed (at Block 712 shown in FIG. 7). For each such call 814, call data corresponding to: the associated date 816 of the call, a call activity indicia or icon 818 uniquely corresponding to the calling activity or nature of the call (e.g. placing an outgoing call, answering an incoming call, or missing an incoming call), and call information 820 (e.g. third telephone number and/or corresponding contact name to or from which the call has been made) is displayed. Each call entry 814 is also provided with a line indicia or icon 822 (similar to the line indicia 644), each of which uniquely corresponds to one of the communication lines.

Figure 8A:
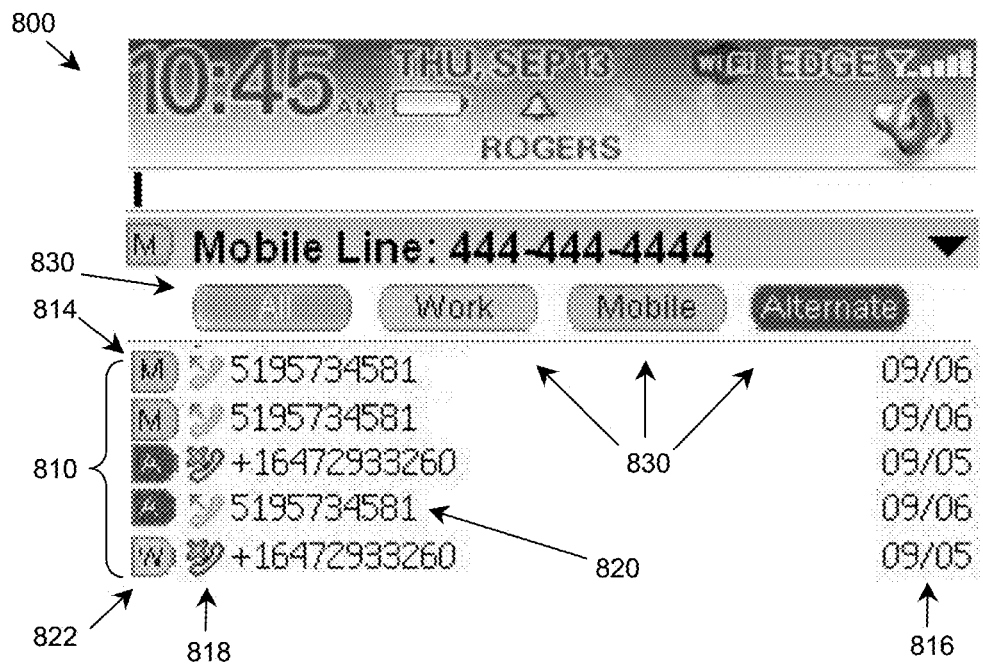
FIGS. 8A to 8D are examples of screenshots of a user interface provided to a user in accordance with an example implementation of another embodiment.
Figure 8B:
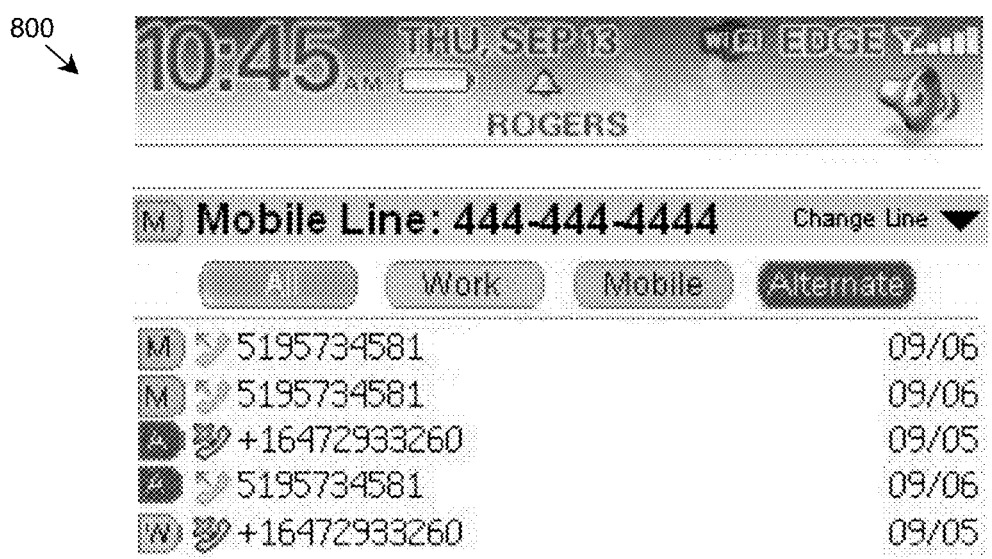
Figure 8C:
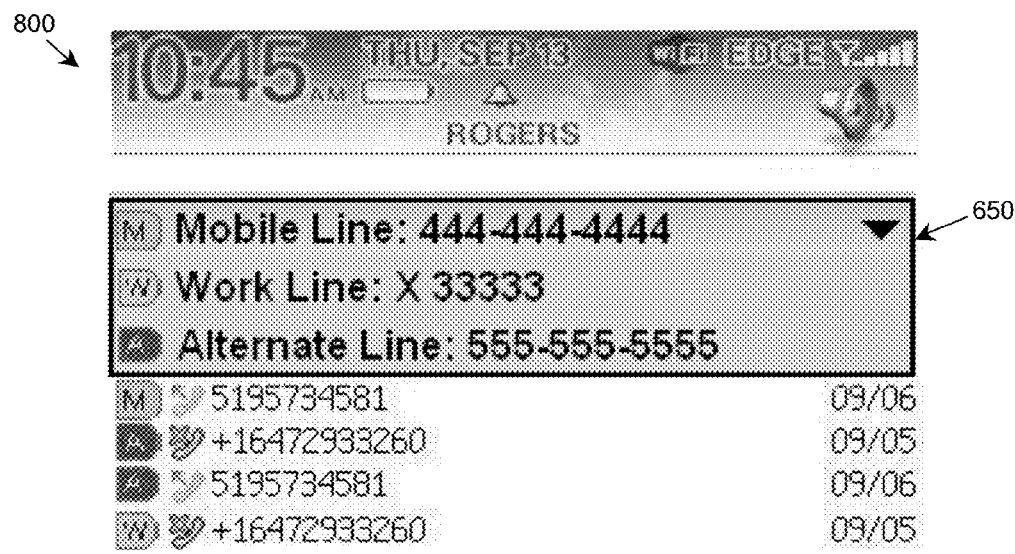

In some embodiments, at Block 714 (shown in FIG. 7), the call log entries 814 are grouped according to line indicia 822 prior to being displayed in groups at Block 712, as illustrated in FIG. 8A. Further, in some embodiments, at Block 716 (shown in FIG. 7) the grouped call log entries 814 may be ranked, prior to display at Block 712 (shown in FIG. 7).

In some embodiments, at Block 718 (shown in FIG. 7), a communication line may be selected (for example, as in accordance with method 500, discussed above). Upon selection of a communication line, at Block 720 (shown in FIG. 7), the group of call log entries 814 having a line indicia 822 corresponding to the selected communication line, is displayed first.

Figure 8D:
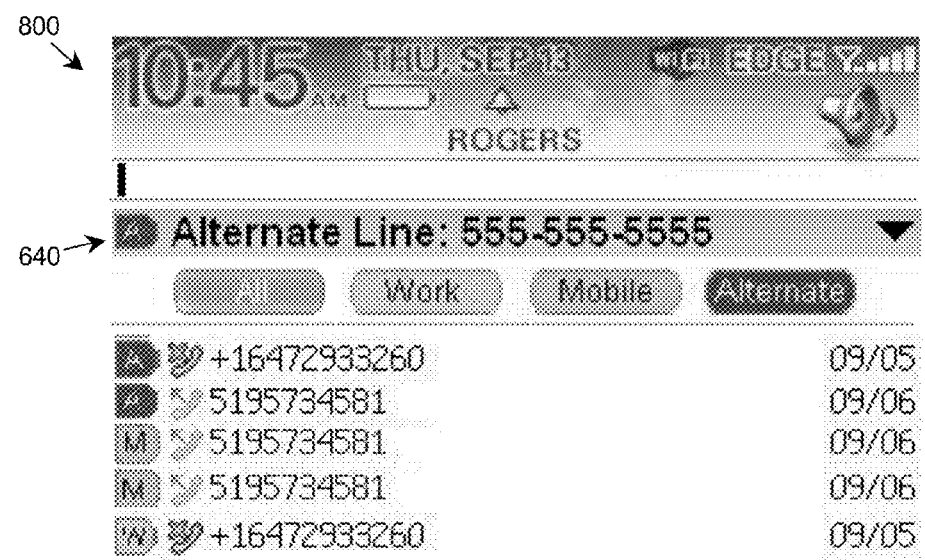

As can be seen in the example screen shot 800 of FIG. 8D, the "Alternate Line" has been selected (for example, as per Block 516 of method 500 shown in FIG. 5). As a result, in Block 720 (shown in FIG. 7), the call log entries 814 having a line indicia 822 corresponding to the "Alternate Line" are displayed in a group, first before the other groups of call log entries 814.

Furthermore, in some embodiments, as illustrated in FIG. 8A, call log category selection buttons 830 are displayed in the call screen 800. One call log category selection button 830 is provided for each call log category, and in turn, each call log category corresponds to at least one communication line. Thus in the illustrated example of FIG. 8A, a call log category selection button 830 is provided for the "Work", "Mobile" and "Alternate" lines. In addition, one of the call log category selection buttons 830 corresponds to a call log category corresponding to "All" of the communication lines. In other embodiments, different call log categories may be established.

By "clicking" or otherwise selecting a call log category selection button 830, at Block 722 (shown in FIG. 7), a user may select a corresponding call log category. Once a call log category has been selected, in Block 724 (shown in FIG. 7), the call log entries are filtered for those corresponding to the selected call log category, prior to display in Block 712 (shown in FIG. 7). For example, if a "Mobile" call log category is selected, the call log entries would be filtered for those corresponding to the "Mobile" communication line, and only the "Mobile" call log entries would be displayed. In the example data of FIG. 8A, the "All" call log category has been selected, and as a result, call log entries 814 corresponding to all of the communication lines are displayed.

It will be understood by persons skilled in the art that the features of the user interfaces illustrated with reference to the example screenshots described herein are provided by way of example only. It will be understood by persons skilled in the art that variations are possible in variant implementations and embodiments.

The steps of a method of providing a user interface that facilitates user selection of a communication line for an outgoing call on a mobile device in accordance with any of the embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of providing on a mobile device a user interface for selecting one of a plurality of communication lines on which outgoing calls are placeable, the method comprising:

displaying a call screen on a display of the mobile device;

upon detecting call screen initiation, displaying on the call screen a line selection menu containing a plurality of line identifiers, each line identifier uniquely identifying a corresponding one of the plurality of communication lines, each of plurality of communication lines which outgoing calls are placeable being associated with a unique telephone number; and, detecting selection of one of the plurality of line identifiers, wherein upon such selection the communication line corresponding to the selected one of the plurality of line identifiers becomes a currently active line on which an outgoing call will be placed.

2. The method of claim 1, further comprising displaying a first line identifier identifying a first of the plurality of communication lines in a first display field of the call screen.

3. The method of claim 1, wherein at least one line identifier comprises the unique telephone number associated with its corresponding communication line.

4. The method of claim 1, further comprising movement of a selection element displayed on the call screen.

5. The method of claim 4, wherein the selection element is moved into a first display field.

6. The method of claim 4, wherein the selection element is moved into an outgoing call input field.

7. The method of claim 1, further comprising receiving input corresponding to initiation of an outgoing call.

8. The method of claim 7, wherein the input corresponds to a telephone number.

9. The method of claim 1, wherein at least one of the line identifiers comprises a line indicia.

10. The method of claim 9, wherein the line indicia comprises an icon.

11. A non-transitory computer-readable medium comprising instructions executable on a processor of the mobile device for causing the mobile device to implement the method of claim 1.

12. A system for providing a user interface that facilitates user selection of a communication line for an outgoing call on a mobile device, the mobile device configured to provide access to a plurality of communication lines on which outgoing calls are placeable, the mobile device comprising a processor, a display, and at least one input device, wherein the system is configured to execute an application programmed to perform the method as claimed in claim 1.

13. A mobile device comprising a processor, a display, and at least one input device, wherein the mobile device is configured to access a plurality of communication lines; and wherein the processor is configured to:

display a call screen on a display of the mobile device;

upon detecting call screen initiation, display on the call screen a line selection menu containing a plurality of line identifiers, each line identifier uniquely identifying a corresponding one of the plurality of communication lines, each of plurality of communication lines which outgoing calls are placeable being associated with a unique telephone number; and, detect selection of one of the plurality of line identifiers, wherein upon such selection the communication line corresponding to the selected one of the plurality of line identifiers becomes a currently active line on which an outgoing call will be placed.

14. The mobile device of claim 13, wherein the processor is further configured to display a first line identifier identifying a first of the plurality of communication lines in a first display field of the call screen.

15. The mobile device of claim 13, wherein at least one line identifier comprises the unique telephone number associated with its corresponding communication line.

16. The mobile device of claim 13, wherein the processor is configured to move a selection element displayed on the call screen.

17. The mobile device of claim 16, the selection element is moved into a first display field.

18. The mobile device of claim 16, wherein the selection element is moved into an outgoing call input field.

19. The mobile device of claim 13, wherein the processor is configured to receive input corresponding to initiation of an outgoing call.

20. The mobile device of claim 19, wherein the input corresponds to a telephone number.

* * * * *